United States Patent
Russell

(10) Patent No.: US 8,760,499 B2
(45) Date of Patent: *Jun. 24, 2014

(54) THREE-DIMENSIONAL IMAGER AND PROJECTION DEVICE

(71) Applicant: Austin Russell, Newport Beach, CA (US)

(72) Inventor: Austin Russell, Newport Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/842,421

(22) Filed: Mar. 15, 2013

(65) Prior Publication Data

US 2013/0215235 A1   Aug. 22, 2013

Related U.S. Application Data

(63) Continuation-in-part of application No. 13/458,956, filed on Apr. 27, 2012.

(60) Provisional application No. 61/481,118, filed on Apr. 29, 2011.

(51) Int. Cl.
H04N 13/02   (2006.01)

(52) U.S. Cl.
USPC .......................................................... 348/46

(58) Field of Classification Search
USPC .......................................................... 348/46
See application file for complete search history.

(56) References Cited

U.S. PATENT DOCUMENTS

| | | | | |
|---|---|---|---|---|
| 5,913,727 A * | 6/1999 | Ahdoot | ........................ | 463/39 |
| 6,078,047 A * | 6/2000 | Mittleman et al. | ........ | 250/338.1 |
| 6,353,422 B1 | 3/2002 | Perlman | | |
| 6,971,753 B2 * | 12/2005 | Tseng | ........................ | 353/122 |
| 7,872,637 B2 | 1/2011 | Seeman et al. | | |
| 8,007,110 B2 * | 8/2011 | Dunn et al. | ....................... | 353/28 |
| 8,066,377 B1 * | 11/2011 | Husak et al. | ....................... | 353/7 |
| 8,150,142 B2 * | 4/2012 | Freedman et al. | ............ | 382/154 |
| 8,570,372 B2 | 10/2013 | Russell | | |
| 2005/0168700 A1 | 8/2005 | Berg et al. | | |
| 2006/0281435 A1 * | 12/2006 | Shearer et al. | ............. | 455/343.1 |
| 2008/0150913 A1 * | 6/2008 | Bell et al. | ........................ | 345/175 |
| 2009/0077504 A1 * | 3/2009 | Bell et al. | ........................ | 715/863 |
| 2009/0103925 A1 * | 4/2009 | Alpert | ........................... | 398/130 |
| 2009/0217191 A1 * | 8/2009 | Shin et al. | ........................ | 715/773 |
| 2011/0175983 A1 * | 7/2011 | Park et al. | ........................ | 348/46 |
| 2012/0056982 A1 * | 3/2012 | Katz et al. | ........................ | 348/43 |
| 2012/0092328 A1 * | 4/2012 | Flaks et al. | ..................... | 345/419 |
| 2012/0177254 A1 * | 7/2012 | Lee et al. | ....................... | 382/107 |
| 2012/0196679 A1 * | 8/2012 | Newcombe et al. | ............ | 463/36 |
| 2012/0239174 A1 * | 9/2012 | Shotton et al. | .................. | 700/93 |
| 2012/0277001 A1 * | 11/2012 | Lansdale et al. | ................ | 463/39 |

OTHER PUBLICATIONS

Olsen Jr., et al., "Laser Pointer Interaction", CHI (2001), pp 17-22.

(Continued)

*Primary Examiner* — Jorge L Ortiz Criado
*Assistant Examiner* — Jeremaiah C Hallenbeck-Huber
(74) *Attorney, Agent, or Firm* — Knobbe, Martens Olson & Bear, LLP

(57) ABSTRACT

The systems and methods described herein include a device that can scan the surrounding environment and construct a 3D image, map, or representation of the surrounding environment using, for example, invisible light projected into the environment. In some implementations, the device can also project into the surrounding environment one or more visible radiation pattern patterns (e.g., a virtual object, text, graphics, images, symbols, color patterns, etc.) that are based at least in part on the 3D map of the surrounding environment.

20 Claims, 11 Drawing Sheets

(56) References Cited

OTHER PUBLICATIONS

Video titled: "Review: The Virtual Keyboard", accessed at http://www.youtube.com/watch?v=2fdDRGr64TQ on Aug. 1, 2012.
Video titled: "'Holographic projection' using Kinect SDK" accessed at http://www.youtube.com/watch?v=9xMSGmjOZIg&feature=related on Dec. 4, 2012.
Video titled: "Drawing on the air by 3D Tube", accessed at http://www.youtube.com/watch?v=6_1eVXbQT-c&feature=plcp&context=C390d303UDOEgsToPDsklCkOqvlPLOa1PtvCMzi3BF on Dec. 4, 2012.
Wikipedia entry titled "Projection Keyboard", accessed on Aug. 1, 2012 (http://en.wikipedia.org/wiki/Projection_keyboard)
Wikipedia entry titled "Computer Vision", accessed on Dec. 4, 2012 (http://en.wikipedia.org/wiki|Computer_vision).
Wikipedia entry titled "Parabolic Antenna", accessed on Dec. 4, 2012 (http:!/en.wikipedia.org/wiki/Parabolic_antenna).
Wikipedia entry titled "Curved Mirror", accessed on Dec. 4, 2012 (http://en.wikipedia.org/wikiiSpherical_reflector).
Wikipedia entry titled "3D Scanner", accessed on Dec. 4, 2012 (http//en.wikipedia.org/wiki/3d_scanner).
Wikipedia entry titled "Holography", accessed on Dec. 4, 2012 (http://en.wikipedia.org/wiki|Holography).
Wikipedia entry titled "Phased-Array Optics", accessed on Dec. 4, 2012 (http://en.wikipedia.org/wiki/Phased-array_optics).
Wikipedia entry titled "Virtual Retinal Display", accessed on Dec. 4, 2012 (http://en.wikipedia.org/wiki/Virtual_retinal_display).
"Simple 3D: 3D Scanners, Digitizers, and Software for making 3D Models and 3D Measurements", accessed on Dec. 7, 2012 at (http://www.simple3d.com/#holography).
"Structured Light 3D Scanning", accessed on Dec. 7, 2012 (http://www.instructables.com/id/Structured-Light-3D-Scanning/#step1).
"Structured light 3D scanning" accessed on Dec. 7, 2012 (https://sites.google.com/site/structuredlight/).
"Structured-light: Utilities for structured light scanning" accessed on Dec. 7, 2012 (http://code.google.com/p/structured-light/).
"HTML5-based Depthcam puts a fresh spin on Kinect hacks" accessed on Dec. 7, 2012 (http://www.engadget.com/20 12/02/08/html15-based-depthcam-puts-a-fresh-spi n-on-kinect-hacks/).
"Natural Interaction Research" accessed on Dec. 7, 2012 (http://research.microsoft.com/en-us/groups/natural/).
"3D-Sensing Custom Software" accessed on Dec. 7, 2012 (http://www.evoluce.com/en/software/customized software.php).
Ebay.com listing for "Vivitek Qumi Q2 300 Lumen WXGA HDMI 3D-Ready Pocket DLP Projector (Black)", accessed on Dec. 7, 2012 (http://www.ebay.com/itm|Vivitek-Qumi-Q2-300-Lumen-WXGA-HDMI-3D-Ready-Pocket-DLP-Projector-Black-/290654593927?#ht_4773wt_1139).
"3D Virtual Sound Technology Gives Unlimited Listening Positions" accessed on Dec. 7, 2012 (http://www.diginfo.tv/v/11-0165-u-en.php)
Microvision Interactive Projection PicoMagic PDE 2 Specifications, 2011.
Lee, et al. "Measuring properties of superposed light beams carrying different frequencies", Optics Express, vol. 11, No. 8, Apr. 21, 2003, pp. 944-951.
Program brief titled: "Microvision Color Eyewear Development Program". © 2007 Microvision, Inc.
Pico Projector Displays: "Embedded", accessed on Dec. 10, 2012 (http://web.archive.org/web/2011 0614212255/http://www.microvision.com.
"Winner Announcement: Intel ISEF 2012 Special Awards Ceremony", Intel International Science and Engineering Fair 2012, pp. 1, 4.
Woods, Elliot; "Kinect Hadouken" (video); Jan. 12, 2011; Kimichi and Chips' blog; available at http://www.kimchiandchips.com/blog/?m=201101.
Carmody, Tim; "How Motion Detection Works in Xbox Kinect"; Nov. 3, 2010; Wired, Gadget Lab; available at http://www.wired.com/gadgetlab/2010/11 /tonights-release-xbox-kinect-how-does-it-work/.
Hecht, Jeff; "Kinect used to create holographic video of Princess Leia"; Jan. 24, 2011; Newcientist, One Per Cent blog: availableat http://www.newscientist.com/blogs/onepercent|2011 /01 /kinect-used-to-create-holograp. html.

\* cited by examiner

THREE-DIMENSIONAL IMAGER AND PROJECTION DEVICE

CROSS-REFERENCE TO RELATED APPLICATIONS

This application is a continuation-in-part of U.S. patent application Ser. No. 13/458956, filed on Apr. 27, 2012, and titled "THREE-DIMENSIONAL IMAGER AND PROJECTION DEVICE," which claims the benefit under 35 U.S.C. §119(e) of U.S. Provisional Application No. 61/481,118, filed on Apr. 29, 2011, and titled "A MOBILE INTERACTIVE OPTICAL PROJECTION APPARATUS." These prior applications are hereby incorporated by reference herein in their entirety.

BACKGROUND

1. Field of the Invention

This application relates to the fields of optical imaging and/or projection. Various implementations disclosed in this application disclose systems and methods that provide a three-dimensional imager and optical projection device.

2. Description of the Related Art

Augmented reality (AR) includes a direct or indirect view of a physical, real-world environment whose elements are augmented by computer-generated digital information such as text, graphics, sound, etc. In AR, the real-world environment of a user can be interactive and/or digitally manipulated. Systems that can be used to provide AR utilize various technologies including, but not limited to, optical imaging and optical projection technology that can collect information about, and then augment, a real-world environment. AR systems can also use software and algorithms for performing object recognition, gesture recognition, object tracking, etc. Systems that are used to provide AR can be used in a variety of applications including but not limited to personal and mass media communications, video gaming, imaging, education, and military applications, etc.

SUMMARY

The systems, methods and devices of the disclosure each have several innovative aspects, no single one of which is solely responsible for the desirable attributes disclosed herein.

A system for remotely powering an electronic device is disclosed herein. In some implementations, the system comprises: one or more sensors, the one or more sensors being configured to detect at least visible or invisible light from a field of view; one or more projectors, the one or more projectors being configured to project at least invisible light into the field of view; and one or more processors configured to control the one or more projectors to project at least one or more invisible light patterns into the field of view; analyze the invisible light detected by the one or more sensors in order to identify the location of an electronic device within the field of view; and control the one or more projectors to project a beam of electromagnetic radiation toward the identified location in the field of view in order to power the electronic device by wirelessly transferring energy to the electronic device.

A device for collecting multispectral data from a field of view is disclosed herein. In some implementations, the device comprises: one or more sensors, the one or more sensors being configured to detect light in two or more spectral bands, including light outside of the visible spectrum, from one or more fields of view, and to create one or more multispectral images of the one or more fields of view; one or more projectors, the one or more projectors being configured to project a light pattern into at least one of the one or more fields of view; and one or more processors configured to analyze the data in at least one of the spectral bands detected by the one or more sensors in order to generate depth data indicative of the depth of at least one item in at least one of the one or more fields of view; and combine the one or more multispectral images and the depth data to create multi-dimensional data of at least one of the one or more fields of view.

A 3D movie camera system is disclosed herein. In some embodiments, the 3D movie camera system comprises: one or more cameras, the one or more cameras being configured to detect visible light and invisible light from a field of view, and to create visible light images and invisible light images of the field of view; one or more projectors, the one or more projectors being configured to project invisible light into the field of view; and one or more processors configured to control the one or more projectors to project at least one or more invisible light patterns into the field of view; analyze the invisible light images detected by the one or more cameras in order to generate depth data indicative of the depth of at least one item in the field of view; combine the visible light images and the depth data to create three-dimensional data of the field of view; and execute a processing function on the three-dimensional data, the processing function being selected from the group comprising virtually moving the camera location, distinguishing the item in the field of view based on the depth data, adding a virtual light source, changing the depth of focus of the visible light images, three-dimensional content-aware fill, or creating a stereoscopic image of the field of view using at least two virtual cameras.

A three-dimensional imager and projection device is disclosed herein. In some implementations, the device comprises: one or more cameras, the one or more cameras being configured to detect visible light and invisible light from one or more fields of view, and to create one or more visible light images and one or more invisible light images of the one or more fields of view; one or more projectors, the one or more projectors being configured to project at least invisible light into at least one of the one or more fields of view; and one or more processors, the one or more processors being configured to control the one or more projectors to project at least one or more invisible light patterns into at least one of the one or more fields of view; analyze the one or more invisible light images detected by the one or more cameras in order to generate depth data indicative of the depth of at least one item in at least one of the one or more fields of view; and combine the one or more visible light images and the depth data to create three-dimensional data of at least one of the one or more fields of view, wherein the one or more invisible light patterns are dynamically adjusted so as to increase the resolution of the depth data in at least one portion of the field of view.

Details of various implementations of the subject matter described in this specification are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements. Note that the relative dimensions of the figures may not be drawn to scale.

DETAILED DESCRIPTION

Figure 1:
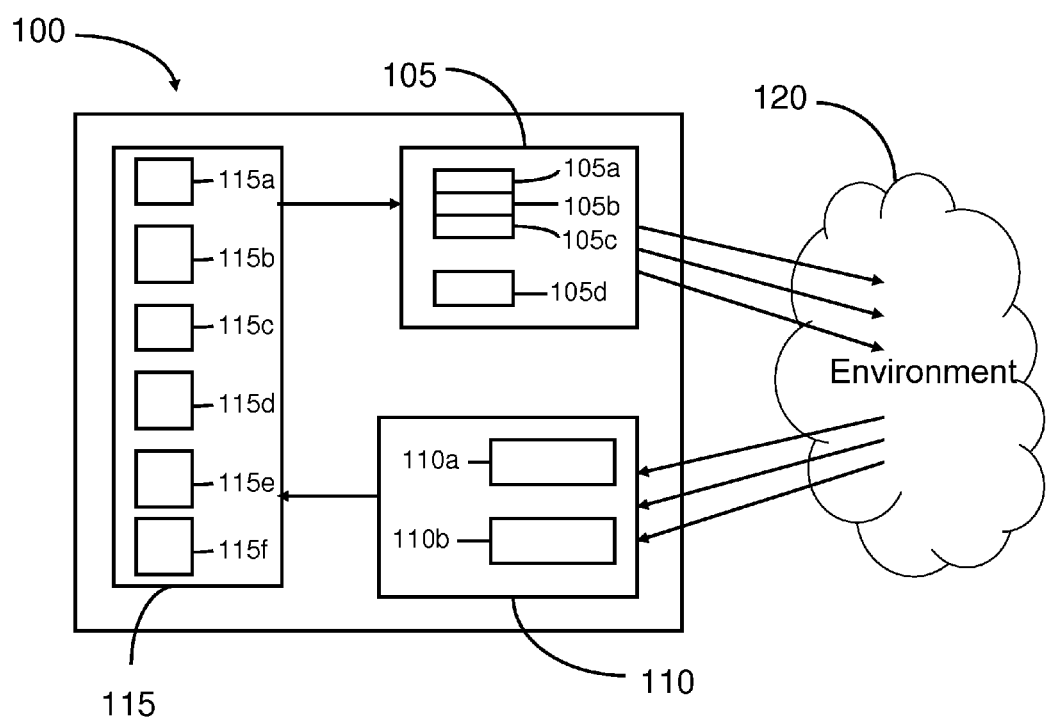
FIG. 1 illustrates an example implementation of a device that can be used to collect three-dimensional information about an environment within a field of view and/or to provide augmented reality.

Various implementations described herein include a device having one or more cameras that can receive input from the surrounding environment that is within the field of view of the device. The input can include, for example, visible light images (video or still) and invisible light images (video or still). The input can be obtained and processed in real-time. In various implementations, the device can recognize and act on user input from the camera images. For example, the input from the user can include gestures, facial expressions, etc. The device can include a processor that can analyze the received input and generate three-dimensional (3D) data of the surrounding environment. The 3D data of the surrounding environment can include, for example, information associated with data points, or voxels, in the 3D space of the field of view (for example, in a Cartesian coordinate system (e.g. x-, y-, and z-coordinates) or a polar coordinate system (e.g. r- and θ- values)). In various implementations, the 3D data can include color information (e.g. RGB color values) associated with the positions (e.g., depths) of data points in the field of view. The processor can process the 3D data and generate an output. In various implementations, the output can be a light pattern (e.g., regular or irregular patterns, including any virtual object, text, graphic, image, symbol, color, etc.) that is projected by the device into the field of view. Accordingly, the device can further include an optical projection module that can project the output generated by the processor onto a display associated with the device or into the surrounding environment to establish an augmented reality.

Particular implementations of the subject matter described in this disclosure can have various potential advantages. For example, the devices described herein can be used to enhance a user's interaction with a real-world environment. Various implementations of the devices can be used to provide information (e.g., distance information, temperature information, object recognition, consumer information, such as ratings, value, etc.) about objects in a real-world environment. The devices can be used to facilitate communication between two users. In various implementations, the devices can be used to manipulate and/or interact with virtual objects, both on a surface and in space, in a real-world environment. For example, the device can be used to project a virtual keyboard on a surface, which can be used to control a computer. As another example, the user can provide gestures as an input which can be processed by the device to provide instructions (e.g., turn on/off, move, adjust the settings, etc.) to various electronic systems and instruments in the real-world environment. As yet another example, the device can be used to charge various electronic systems and instruments in the real-world environment. The device can be used to alter the appearance of objects in the real-world environment. Many other advantages and benefits can be provided by the devices described herein. For example, unlike conventional liquid crystal based display devices, the native resolution of the projected output is not fixed and accordingly the devices can advantageously display the generated output at various resolutions.

FIG. 1 illustrates an example implementation of device 100 that can be used to collect 3D information about an environment within a field of view and/or to provide augmented reality. The device 100 includes one or more optical projection modules 105, one or more input devices 110 that can receive information from a surrounding environment 120, and a processing and control unit 115. The optical projection module 105 can include a plurality of optical sources 105a, 105b, 105c, and 105d. In various implementations, the optical sources 105a-105d can provide collimated light. The optical sources 105a-105d can also provide coherent light. The use of coherent, collimated optical sources can be advantageous so as to project visible and invisible light patterns that remain in focus relatively independent of projection distance and surface distortions. The optical sources 105a-105d can be, for example, laser diodes. In various implementations, the optical sources 105a, 105b, and 105c are visible light sources that output visible light of different wavelengths (e.g. red, green and blue laser diodes), while the optical source 105d is a source of invisible light (e.g., infrared or terahertz radiation). The invisible light source 105d can be, for example, an infrared laser diode or a quantum cascade laser diode. The optical source 105d can also be some other source of invisible light, such as a maser, an x-ray source, etc. In various implementations, the invisible light can be obtained via photomixing.

The input device 110 can include a plurality of sensors 110a and 110b that can receive information from the surrounding environment 120. The plurality of sensors 110a and/or 110b can include visible light cameras, infrared light cameras, charge coupled device detectors, CMOS detectors, or any other suitable sensor that uses one or more photodetectors to record light data (e.g., photodiodes, etc.), depending upon the choice of light sources in the optical projection module 105. The plurality of sensors 110a and 110b are configured to receive input information (e.g. visible light and invisible light) from the surrounding environment 120 within a field of view of the device 100. In some implementations, the sensor 110a can be a visible light camera adapted to receive visible light from the environment to form a visible light image (using one or more pixels) of the environment, while the sensor 110b can be an invisible light camera (e.g., an infrared camera) adapted to receive invisible light (e.g., infrared light) from the environment to form an invisible light image. In various implementations, the sensors 110a and 110b can be replaced by a single broadband sensor that can detect both visible and invisible light. The visible and invisible light detected by the single broadband sensor can be output as separate color data channels (e.g., multispectral data) and transmitted to the processing and control unit 115.

The processing and control unit 115 can include an electronic circuit that can execute a set of programmable instructions. In various implementations, the processing and control unit 115 can include a controller 115d to, for example, cause the optical projection module to project desired visible and invisible light patterns (which can consist of a single point or multiple points), as discussed herein. In various implementations, the processor can also include various modules that can process the information received by the input device 110. For example, the processor can include a depth data module 115a that can analyze input information to extract depth information, a 3D data module 115b that can generate 3D data of the environment in the field of view of the device 100, a gesture recognition module 115c that can detect and interpret gestures or other input from a user 100, etc. Other modules, such as tracking modules, object recognition modules, etc. can also be included. The processing and control unit 115 can also include one or more memory units 115e which can be accessed by, for example, the various modules 115a-115d of the processor. In various implementations, the one or more memory units 115e can include a set of executable instructions that can be executed by the processor. In various implementations, the processing and control unit 115 can also include a transceiver 115f that can transmit signals to and/or receive signals from the environment 120 or remote devices, as described herein. In various implementations, the modules 115a-115b can be implemented using one or more processors.

The device 100 can also include additional active and passive optical components such as optical amplifiers, polarization beam splitters/combiners, polarization rotators, quarter wave plates, attenuators, lenses, prisms, collimators, gratings, filters, couplers, condensors, etc. that condition the light emitted into the environment from the projection module and/or the light that is received from the environment and input to the sensors 110a or 110b. Further, the device 100 can include additional electrical components such as electrical amplifiers, switches, etc. that are not illustrated in FIG. 1.

Figure 2:
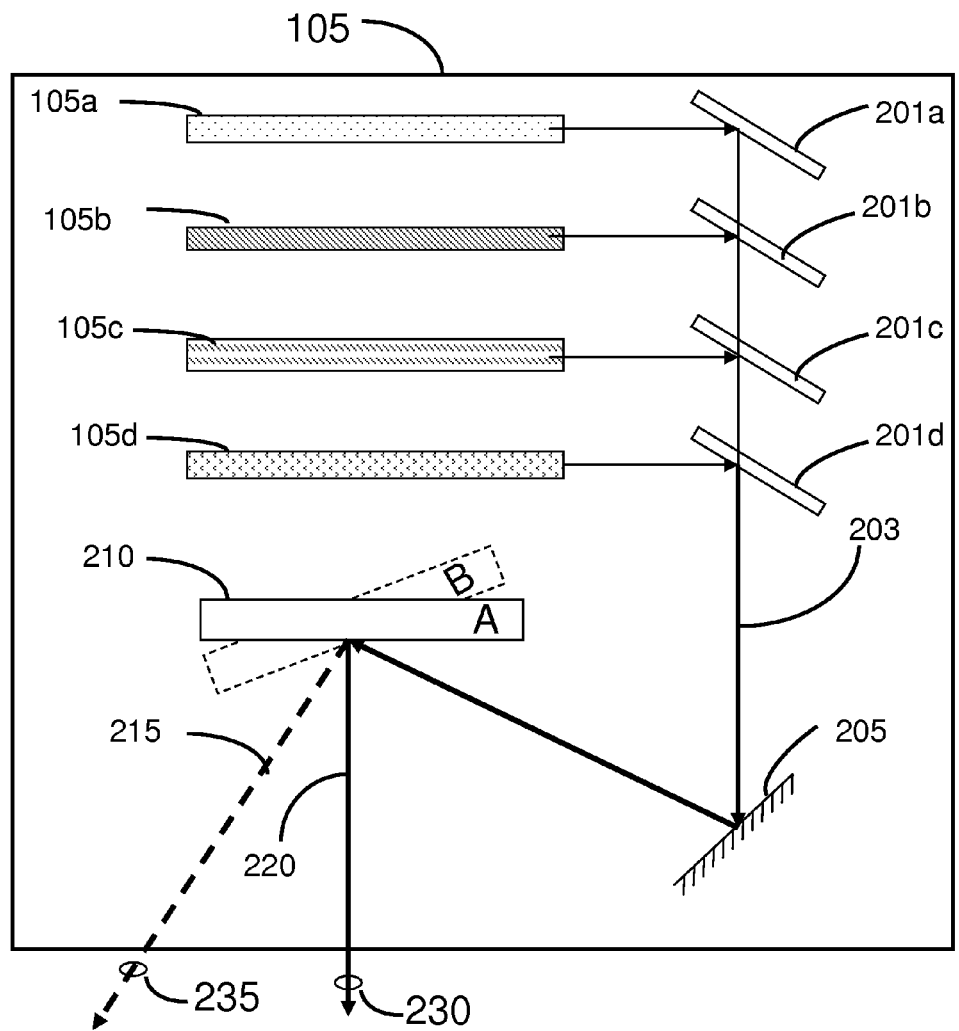
FIG. 2 illustrates an example implementation of an optical projection module that can be used in some implementations of the device illustrated in FIG. 1.

FIG. 2 illustrates an example implementation of the optical projection module 105 that can be used in some implementations of the device 100 illustrated in FIG. 1. In the illustrated implementation of the optical projection module, light from the various optical sources 105a-105d is combined using optical beam combiners 201a-201d into a single light output beam, of which light ray 203 is representative. In various implementations, the optical beam combiners 201a-201d can include dichroic filters, reflectors, beam splitters, waveguide based optical combiners, fiber-optic based optical combiners, etc., or any other component that would be suitable for directing, combining, or outputting light from the optical sources 105a-105d, depending upon the wavelengths of light provided by the sources. The combined light output 203 is reflected by a reflector 205 onto a scanning mirror 210. In various implementations, the scanning mirror 210 can include a mirror coupled to a motor (e.g. a servo motor, stepper motors, etc.), an electromechanical systems device such as, for example, a galvanometer, a piezo-electric device, etc. In some implementations, multiple scanning mirrors 210 of various sizes and locations can be used. In addition, in some implementations, some other type of scanning module besides a scanning mirror 210 can be used. For example, a scanning module can include prisms, diffraction gratings, and/or other optical components coupled to an actuator of suitable type.

In various implementations, the scanning mirror 210 can be adapted to steer the output beam in any direction to achieve full scanning capabilities of the environment in the field of view of the device. For example, when the scanning mirror 210 is in position B, the combined light output from the reflector 205 is directed out of the optical projection module as light beam 220, and can scan a first region 230 of the environment in the field of view. When the scanning mirror 210 is in position A, the combined light output from the reflector 205 is directed out of the optical projection module as light beam 215, and can scan a second region 235 of the environment in the field of view. In some implementations, the scanning mirror 210 raster scans the combined light output across a field of view, for example, with a relatively high refresh rate. In various implementations, each optical source 105a-105d can be individually modulated (e.g. turned on or off, dimmed, brightened, focus adjusted, spectrally modulated, etc.) by the processing and control unit 115 so as to create independent patterns (e.g., independent red, green, and blue visible patterns, and an independent invisible pattern, any of which may overlap) as the combined output beam is scanned across the field of view. In various implementations, the processing and control unit 115 can modulate each optical source 105a-105d to generate visible light patterns and invisible light patterns for various applications, as discussed herein. An optical projection module, such as illustrated in FIG. 2, can have an advantage of not being limited to any particular native resolution, unlike, for example, some other projection systems.

The device 100 illustrated in FIG. 1 can be used in a variety of applications. For example, various implementations of the device 100 can be used in imaging applications to create, for example, 3D images, maps, representations, etc. of an environment within a field of view. Various implementations of the device 100 can also be used in augmented reality applications where visible light patterns (e.g. regular or irregular patterns, including any virtual objects, text, graphics, images, symbols, colors, etc.) are projected into a field of view to enhance and/or alter the surrounding environment. Various implementations of the device 100 can also be used in an interactive mode, as discussed herein, for example, with reference to FIGS. 4-6. In such implementations, an input from the user can be detected and processed by the device 100. The processing and control unit 115 can generate an output based on the user input, which output can be a visible pattern that is projected into the user's environment. Various implementations of the device 100 can also be used to identify an electronic device and to send a directed signal that can be used to turn on/off and/or charge the electronic device, as discussed herein, for example, with reference to FIGS. 8 and 9. Depending on any given application, the device 100 can have various modes of operation as discussed in greater detail below.

Figure 3A:
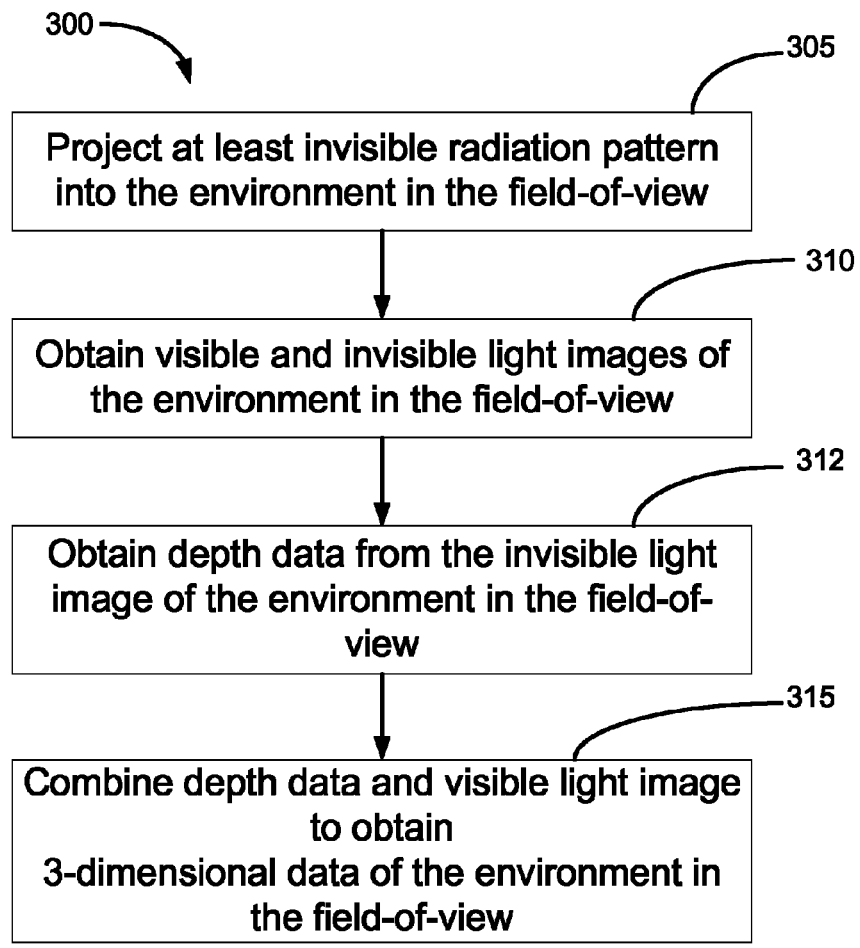
FIGS. 3A and 3B are flow charts illustrating two example modes of operation of the device illustrated in FIG. 1.
Figure 3B:
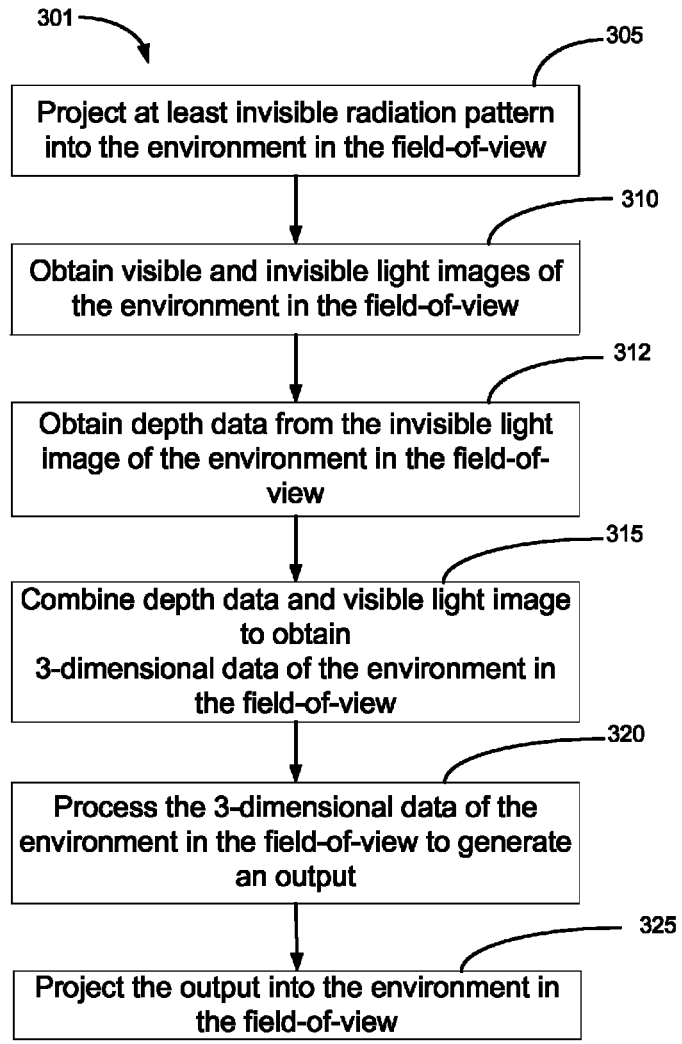

FIGS. 3A and 3B are flow charts illustrating two example modes of operation of the device 100 illustrated in FIG. 1. The mode of operation 300 illustrated in FIG. 3A can be employed in implementations of the device 100 that are used for imaging applications to create, for example, 3D images, maps, or representations of an environment within a field of view of the device 100. In the illustrated mode of operation 300, the device 100 projects one or more invisible radiation patterns into the environment in the field of view of the device 100, as shown in block 305, using the optical projection module 105. The invisible radiation pattern can be, for example, a two-dimensional pattern (e.g., a grid of intersecting lines, an array of dots, etc.) of infrared light. The invisible radiation patterns that are projected into the field of view can be controlled by the processing and control unit 115 in such a manner that the interaction of the invisible light patterns with objects within the field of view can be analyzed to determine the distance between the device and the objects within the field of view, as discussed herein. In some implementations, visible radiation patterns can also be projected into the environment in the field of view.

The device 100 obtains visible and invisible light images of the environment in the field of view, as shown in block 310. The visible and invisible light images can include still images, or successive frames in a video stream. The visible and invisible light images may be obtained by using the sensors 110a and 110b described above with reference to FIG. 1. As already mentioned, these can be, for example, a visible light camera and an invisible light camera, such as an infrared camera. The visible light images obtained by the visible light camera may be formed using both ambient light reflected by the various objects in the environment in the field of view of the device and any visible light pattern that may have been projected into the field of view. Although the ambient visible scene and any projected visible light pattern may be overlaid in the visible light images obtained by the visible light camera, the device 100 can discriminate between these by, for example, comparing the visible light pattern that was projected into the environment with the detected visible light image. Similarly, the invisible light images obtained by the invisible light camera may be formed from both ambient invisible light (e.g., infrared radiation emitted by objects within the field of view based on their temperature) and the invisible light pattern that is projected into the field of view. Again, however, it may be possible for the device 100 to at least partially discriminate between the ambient invisible light and the projected invisible light pattern by comparing the detected invisible light image with the invisible light pattern that was projected into the field of view. The visible and invisible light images obtained can be stored in the memory unit 115e of the processing and control unit 115.

The processing and control unit 115 can process the invisible light images to extract depth data for the various objects in the environment in the field of view of the device 100, as shown in block 312. The depth data can be, for example, information that indicates, the distance from the device 100 to any object located at a particular point or direction in the field of view. Such depth data can be collected for each resolvable point or direction within the field of view. The depth data can be extracted from the invisible light images using a variety of methods. For example, the processing and control unit 115 can compare one or more projected invisible light patterns with corresponding detected invisible light images. In some implementations, the depth data module 115a analyzes the invisible light images to determine how objects within the field of view deform the invisible light pattern that was projected into the field of view (e.g., as in a structured light 3D scanner). In other implementations, the depth data module 115a obtains the depth data from the invisible light images by measuring the time-of-flight for an infrared beam to return from a particular location in the field of view. Other techniques, including triangulation, electromagnetic interference pattern differentiation, dual laser projection from two different angles, optical coherence tomography (OCT), etc. can also be used.

A variety of invisible light patterns can be projected into the environment within the field of view of the optical projection module 105 in order to determine depth data. In some implementations, the projected invisible light pattern is relatively static and is either constantly or repeatedly projected into the scene to gather depth data. In other implementations, the projected invisible light pattern is dynamic in that it can be changed from its previous state. In some implementations, the invisible light pattern can be changed frame-by-frame, every several frames, or over some other relatively short period of time as compared to changes in the locations of items in the field of view for a particular application. A dynamic invisible light pattern can be used in order to increase the resolution of the depth data. For example, in some embodiments, the invisible light pattern that is projected into the field of view is a binary pattern, such as an array of dots. In the case of, for example, a time-of-flight depth measurement system, a depth measurement can be collected for each location in a scene that corresponds to the location of a projected dot. If the pattern of projected dots remains relatively static, then depth data is collected for substantially the same locations within the scene over and over. In some implementations, however, the projected invisible light pattern (e.g., an array of dots) can be dynamically spatially shifted in time. For example, at a first time, the invisible light pattern can be projected in the field of view to collect a first set of depth data corresponding to the first set of locations within the field of view. Subsequently, at a second time, the invisible light pattern can be projected into the field of view such that it is shifted horizontally, vertically, and/or horizontally and vertically with respect to the pattern that was projected at the first time. In this way, the invisible light pattern that is projected at the second time can sample a second set of points within the field of view that is different from the first set of points. This can yield a second set of depth data which can be used to enhance the resolution of the composite depth data.

In some implementations, the projected invisible light pattern that is used to collect depth data can be varied dynamically using, for example, a feedback loop. The feedback loop can be responsive to a characteristic of the scene that is measured by, for example, the depth data module 115a. As an example implementation of such a feedback loop for dynamically adjusting the projected invisible light pattern, a first invisible light pattern can be projected at a first time in order to collect first depth data. The first depth data can be analyzed by the depth data module 115a in order to determine the distance of various objects within the scene. If a certain object is detected at a distance beyond some threshold, the projected invisible light pattern can be dynamically altered so that the distant object is sampled with greater resolution. In the case of an invisible light pattern that consists of an array of dots, the invisible light pattern can be dynamically adjusted such that the dots are provided more closely spaced in the specific vicinity of a distant object (and, similarly, less closely spaced in the vicinity of a nearby object). This can be advantageous because, if a uniform density binary pattern is projected, distant objects may be sampled with lower resolution than nearby objects due to the spreading of the projected pattern with distance. However, by using this type of feedback loop to adjust the density of the invisible binary pattern in different parts of the field of view, the projected invisible light pattern can be dynamically altered to, for example, to increase, decrease, and/or equalize the resolution of collected depth data at desired sub portions of the scene corresponding to nearby or distant objects. This type of feedback loop can also be used to increase, decrease, and/or equalize the resolution of collected depth data in regions where the depth of a point within the field of view changes rapidly (e.g., the change is greater than some predetermined threshold) with respect to adjacent points.

As discussed herein, in some implementations, the projected invisible light pattern is a binary pattern that consists of areas where the invisible light beam is "on" and other areas where the invisible light beam is "off". In other implementations, however, the projected invisible light pattern can be analog or even a relatively uniform brightness throughout all or a substantial portion of the scene. A projected invisible light pattern having uniform brightness can be used to extract depth data by, for example, utilizing the following method. The invisible light pattern with uniform brightness can be projected into the field of view. Then, the response of objects (e.g., the reflection of the invisible light pattern by the objects) within the field of view to the uniform brightness pattern can be observed with the invisible light camera. The intensity of the invisible light will decrease with increasing distance within the field of view. Accordingly, objects that are closer to the invisible light projector will appear brighter in the image collected by the invisible light camera, while objects that are more distant will appear dimmer due to the reduced intensity of the uniform brightness pattern with increasing distance. Accordingly, the distance of an object within the scene can be determined by the brightness of the response of that object to the projected uniform invisible light pattern. Other sources of invisible light within the scene may interfere with the projected uniform brightness pattern, thus corrupting the measured depth data. However, this difficulty can be at least partially overcome by projecting and/or detecting only a narrow wavelength range of invisible light such that the detected light signal can rise above the noise floor of any other invisible light that is present in the scene from ambient sources within the same wavelength range. For example, a narrow bandwidth invisible light source can be used to project the invisible light pattern, and a narrow bandpass filter corresponding to the same narrow band can be positioned in front of the invisible light camera so as to only collect light having the wavelength(s) of the projected invisible light pattern. Difficulty with background ambient invisible light can also be at least partially overcome by disregarding the initial image intensity data, but taking into account the changes in image intensity data over time. For example, in one implementation, another method of depth extraction can be used to obtain the initial values such as structured lighting, after which the changes in image intensity are used to calculate depth data.

As discussed herein, binary invisible light patterns and uniform invisible light patterns can both be used in order to collect depth data from a scene. In some implementations, a binary invisible light pattern and a uniform invisible light pattern can be projected alternately, or can be superimposed and projected simultaneously. In this way, depth data determined from one of the invisible light patterns can be used to enhance the accuracy and/or resolution of depth data collected by the other invisible light pattern. For example, samples of depth data collected using a binary invisible light pattern consisting of an array of dots can be used to enhance depth data collected using a uniform invisible light pattern.

The depth data can be combined with the visible light images to obtain 3D data of the environment in the field of view, as shown in block 315. In various implementations the environment in the field of view of the device can be considered to be divided into a plurality of regions and the 3D data can include the position, for example in Cartesian or polar coordinates, of each of the plurality of regions. The area of each of the plurality of regions can depend, for example, on the spot size of the projected radiation that scans the environment in the field of view or the resolution of the sensors 110a and 110b that obtain visible and invisible light images, or both. In various implementations, the 3D data can also include color information (e.g. RGB or CMYK values) for each of the plurality of regions. In some implementations, the 3D data of the environment in the field of view can be obtained by texture mapping the visible light images of the field of view onto the depth data obtained from the invisible light images. For example, points within the field of view can be assigned one or more values (e.g., RGB values, as in a digital image) that are indicative of the visible appearance of an object located at that point, as well as a distance value indicative of the distance of the object from the device 100. In this way, a 3D rendering of the scene within the field of view can be created.

As discussed above, the mode of operation 300 can be used for imaging applications to create 3D images of a field of view. Such 3D imaging applications can include, for example, medical imaging applications. In such implementations, the invisible light source 105d can be, for example, a source of infrared, terahertz, or x-ray radiation, and the sensor 110b can be an imaging detector that is sensitive to the selected invisible radiation source. Visible light sources can also be used for projecting patterns from which to detect depth information, and/or for creating images upon which to map depth information.

Additionally, the device 100 operated in the mode 300 described above can also be used as a 3D movie camera. The 3D movie camera can include one or more detectors or sensors that can detect both visible light and invisible light from various objects in the camera's field of view. A method of creating 3D images or representations of a scene can include projecting invisible light from the camera toward objects in the camera's field of view. In various implementations, the invisible light can be a collimated beam of coherent infrared radiation that is scanned across the scene in a particular pattern that will allow for depth data of the scene to be extracted. In various implementations, the invisible light can be monochromatic. The method can further include differentiating an invisible light image (produced from the invisible radiation projected from the device) from a visible light image, and generating a differentiated output. In various implementations, the differentiated output can be a data stream having visible color information (e.g. RGB) and invisible color information for voxels in the scene. The method can further include creating depth data for the scene using the invisible color information. The depth data can indicate, for example, the depth (along a Cartesian z-axis, or a polar radial axis originating at the camera) for data points of the scene.

The depth data or image can be texture mapped, merged, and/or combined with the visible light image using software methods, by a processor in the camera or on a remote machine, to obtain a 3D digital map of the scene. This is distinct from conventional 3D movie cameras, which instead capture separate 2D images from different perspectives (e.g., left-eye and right-eye perspectives) using dual sets of 2D cameras and other accessories. In some implementations, multiple devices 105a-d and 110a-b, and/or the devices 105, 110, and 100 that comprise them, can be stationed at different locations/angular positions about the scene in order to collect data from multiple vantage points and enhance the 3D digital map of the scene. For example, a first device 100 could be stationed at the front of a scene, and a second device 100 could be stationed at the back of the scene, approximately 180° apart from the first device 100. These two devices 100 may jointly be able to collect enough data to create a complete 3D digital map of the scene. It should be understood, however, that any number of devices 100 could be used. Since conventional 3D movie cameras create a 3D effect by superimposing or combining left-eye and right-eye perspectives, the images obtained by conventional 3D filming methods are not actually 3D images of the scene and, accordingly, certain functions such as changing viewing perspective, changing the zoom, etc. may not be able to be performed in post-processing of the images. In contrast, the 3D image obtained from the device 100 is a 3D representation of the scene, including depth data for data points or voxels of the scene. This 3D representation can allow for enhanced post-processing techniques to be applied. Additionally, the 3D images from the device 100 can be post-processed to create separate left-eye and right-eye video streams which can be viewed as a 3D movie using conventional 3D movie projectors and glasses. For example, virtual cameras can be positioned at two or more vantage points within the 3D representation of the scene. The virtual cameras can be used to create images of the scene from their respective vantage points. The images of the scene from the two or more vantage points can then be combined to create virtual stereoscopic 3D images of the scene, as if done by a traditional stereoscopic 3D camera rig.

There are many post-processing techniques that can be applied to the 3D images from the device 100. For example, the 3D image of the scene obtained by the movie camera can be processed using software methods to alter the depth of field to any desired level. This feature can provide cost benefits over conventional 3D camera rigs, which may require expensive lenses or other equipment to change the depth of field, and even then may only be able to do so while filming. In addition, changes in the depth data of the voxels in the 3D image of the scene can be used to identify objects with increased precision and accuracy, for example, to differentiate foreground and background objects for video compositing purposes. This feature can replace chroma key compositing techniques, such as the "Green Screen" that is used in conventional compositing methods to identify the background in a scene. Eliminating the "Green Screen" can provide more realistic images or videos. This method of object or background identification can also advantageously shorten the amount of filming time. Post-processing of the 3D image obtained by the movie camera (e.g., device 100) can be used to add different types of virtual set lighting (e.g., directional virtual set lighting from any perspective with proper shadow placement, virtual set lighting at any location within the scene, etc.) to the captured 3D image of the scene in order to simulate real-world lighting. Post-processing of the 3D image can also allow for other enhancements. For example, since the information captured by the device 100 includes 3D data of the scene, software post-processing algorithms can be used to manipulate the 3D data of the scene to provide special effects such as altering the effective camera placement by zooming in or out, or changing the viewing perspective. Expensive camera rigs, dollies, cranes, etc. are typically required to achieve these effects using conventional 3D filming techniques.

As just discussed, the depth data can be used to distinguish an object in the 3D scene by using the depth data. For example, the depth data can be analyzed to find locations within the scene where the distance to a detected object changes rapidly as a function of a transverse dimension in the scene, or where the change in depth data exceeds a threshold. By using this technique, any object can be isolated, masked, or cropped from the scene. Any such object that is identified in the scene by using the depth information can then be added to a library of 3D virtual objects. Any missing data from the 3D model of the object can be filled in using a content aware fill algorithm. Just as objects can be cropped from the scene, objects from the library of 3D objects can also be added to the scene as virtual objects.

In some implementations, the device 100, when operating in mode of operation 300 as a 3D camera, can be a stand-alone device. In some implementations, however, an existing camera can be modified to perform the functions described herein. For example, an accessory that is capable of projecting an invisible light pattern, as discussed herein, can be attached to an existing camera. The accessory could include an infrared laser diode, or some other invisible light source. In some implementations, the accessory can be designed to connect into the camera's hot shoe connector. The accessory can be controlled by the camera's existing processor.

In addition, the existing image sensor of the camera can be adapted to provide an invisible light image in addition to the visible light images it is already capable of producing. The invisible light patterns that are output by the invisible light projector accessory can be imaged by the camera's lens onto the camera's existing image sensor. The image sensor may include a Bayer filter. The Bayer filter includes a mosaic of small red, green, and blue filter elements in front of the sensor pixels. In many typical cameras, the sensor pixels corresponding to the blue and red filter elements are used to detect chrominance of the image, while the sensor pixels corresponding to the green filter elements (which are twice as numerous as the blue and red filter elements) are used to detect luminance. A typical square of four filter elements in a Bayer filter can include one blue filter element, one red filter element, and two green filter elements. The firmware of the camera can be reconfigured such that luminance is detected using one green filter element instead of two. The remaining green filter element can then be used in conjunction with the blue filter element to detect chrominance. Finally, in the case where the invisible light is infrared light, the red filter element can be used to detect the invisible light because the red filter element is at least partially transmissive to infrared light. In this way, the visible and invisible images can be collected substantially simultaneously using the image sensors of existing cameras, although this technique may decrease the image resolution. In other implementations, the existing camera can operate at a rate greater (e.g., 2×) than its normal frame rate (e.g., 60 frames per second instead of 30 frames per second). The existing image sensor can then be used to detect visible light images in addition to invisible light images (e.g., using the sensor pixels corresponding to red filter elements) in the frames where an invisible light pattern is present. In this type of implementation, the full resolution of the image sensor can be maintained for visible light images.

The mode of operation 301 illustrated in FIG. 3B can be employed in, for example, implementations of the device 100 that are used for augmented reality applications. Some of the functions performed in the mode of operation 301 can be generally similar to the functions performed in the mode of operation 300. In the illustrated mode of operation 301, the device 100 projects visible and/or invisible (e.g., infrared) radiation patterns into the environment in the field of view of the device 100, as shown in block 306, using the optical projection module 105. Visible and invisible light images of the environment in the field of view are obtained, as shown in block 310. The visible and invisible light images may be obtained by using the sensors 110a and 110b (e.g., a visible light camera and an invisible light camera, such as an infrared camera). Depth data is extracted from, for example, the invisible light images, as shown in block 312, and as discussed herein. The depth data can then be combined with the visible light images to obtain 3D data of the environment in the field of view, as shown in block 315, and as discussed herein.

The 3D data of the environment in the field of view can be processed or analyzed by the processing and control unit 115 to generate an output, as shown in block 320. The output can be, for example, an image, a 2D or 3D virtual object, a hologram, a color pattern, text, a graphic, etc. The processing and control unit 115 can then cause the optical projection module 105 to project the visible light pattern output back into the field of view, as shown in block 325. The visible light pattern output can be based at least in part in the 3D data of the environment. In addition, the visible light pattern can be a stereoscopic pattern that appears three-dimensional to a user with 3D-enabled eyewear.

Certain examples of augmented reality applications using the mode of operation 301 illustrated in FIG. 3B will now be described. For example, the device 100 may create a 3D image of a given scene according to blocks 306-315. The processing and control unit 115 may analyze the 2D visible light image and/or the 3D composite representation of the scene using, for example, a variety of algorithms (object recognition, tracking, distance measurement, etc). The processing and control unit 115 may then generate one or more outputs, according to block 320, by causing the optical projection module 105 to project, for example, a visible light pattern corresponding to a detected object into the field of view. The location of a projected visible light pattern can be controlled by the processing and control unit 115, for example, based upon the detected location of a corresponding object within the 3D map of the field of view.

In some implementations, the output visible light pattern may be text that corresponds to an object within the scene. For example, if a guitar were detected within the field of view, then the output visible light pattern could be the text "Guitar" projected onto, or in the vicinity of, the guitar. Alternatively, the processing and control unit 115 could execute a recognition algorithm to determine the brand of the guitar and then access a database of user reviews of the guitar. In such an implementation, the output visible light pattern could be a graphic (e.g., one or more stars) indicative of user ratings of the guitar. Again, this graphic could be projected onto, or in the vicinity of, the guitar. In some implementations, the output visible light pattern could be a distance value that is indicative of the distance from the device to an object within the field of view. Distance values could be projected onto each of several objects within the field of view. In some implementations, the output visible pattern could be a temperature value that is projected onto an object within the field of view. The temperature value could be determined, for example, based on data from an infrared camera. In other implementations, the output could be light projected onto an object in the field of view in order to change the appearance of the object. For example, the apparent color of an object could be altered by projecting light of another color onto the object. Alternatively, the device 100 could implement an active camouflage feature where the background behind a foreground object is analyzed using, for example, a content-aware fill algorithm, and then a light pattern is projected onto the foreground object to make it tend to blend with the background. The device 100 can also project information that it receives from a remote device via, for example, the Internet. These are just a few examples of augmented reality applications that could be executed by the device 100 according to the method 301, though many others are also possible.

Figure 4:
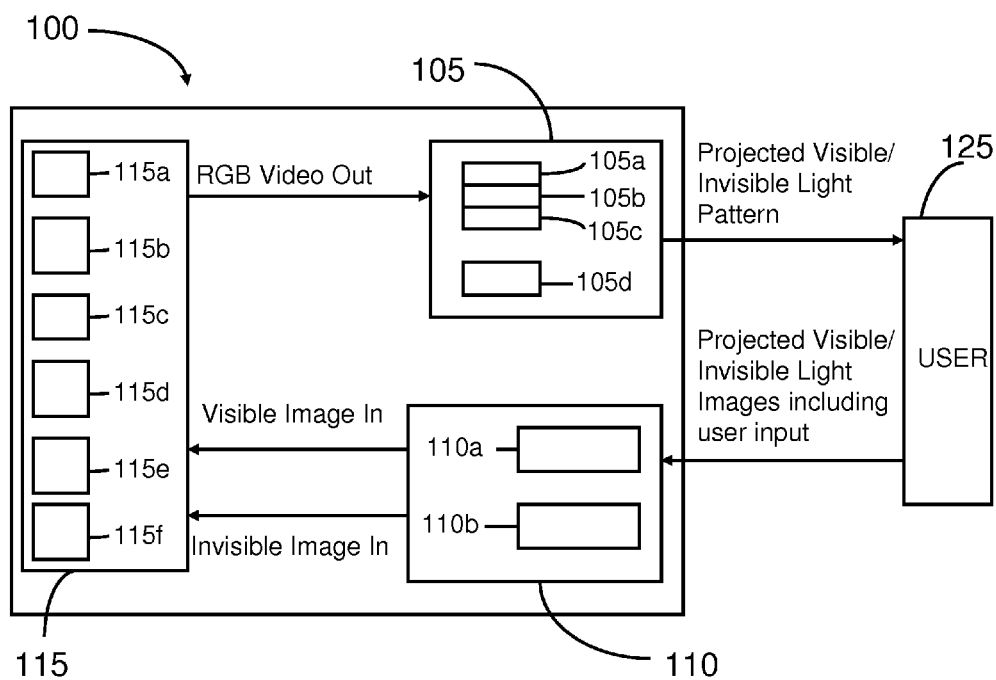
FIG. 4 illustrates an example implementation of the device illustrated in FIG. 1 that is adapted to be used in an interactive mode.
Figure 5:
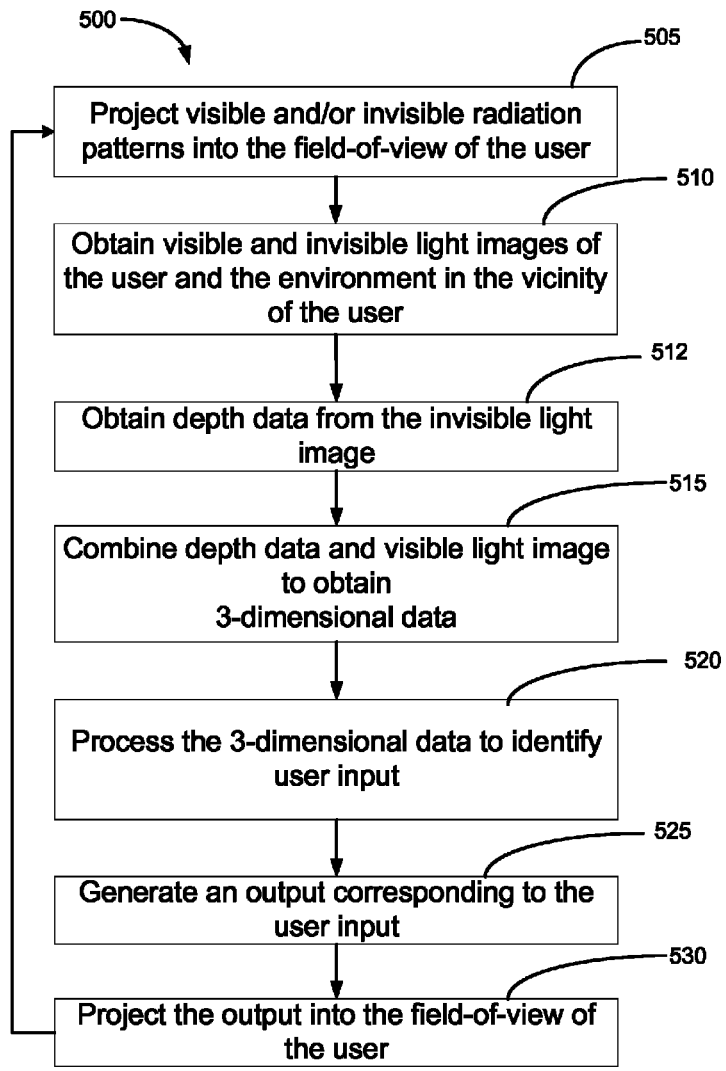
FIG. 5 is a flowchart that illustrates certain operations that can be performed by the device illustrated in FIG. 4 while in the interactive mode.

FIG. 4 illustrates an example implementation of the device 100 illustrated in FIG. 1 that is adapted to be used in an interactive mode. In the interactive mode, the device 100 is adapted to project visible and/or invisible radiation patterns towards, and/or in the vicinity of, a user 125 with the optical projection module 105. In the interactive mode, visible and invisible light images obtained by the sensors 110a and 110b (e.g., a visible light camera and an invisible light camera, such as an infrared camera) can include a user input (e.g. gesture, facial expression, etc.). In various implementations, the device 100 can be used to provide a virtual user interface, as discussed herein FIG. 5 is a flowchart 500 that illustrates certain operations performed by the device illustrated in FIG. 4 while in the interactive mode. Some of the blocks of the flowchart 500 can be generally similar to the blocks depicted in FIGS. 3A and 3B. In block 505 the device 100 is adapted to project visible and/or invisible radiation patterns into the field of view. The device obtains visible and invisible light images of the user and the environment in the vicinity of the user, as shown in block 510. In various implementations, the visible light image also includes the visible radiation pattern projected by the device 100. As shown in block 512, depth data is obtained from the invisible image, as discussed herein. The depth data is combined with the visible light image to obtain 3D data of the user and the environment surrounding the user, as shown in block 515. The depth data and/or the 3D data is processed to identify user input, as shown in block 520. Identification of user input can be done using, for example, gesture recognition algorithms, facial recognition algorithms, object recognition algorithms, object tracking algorithms, etc. In some implementations, to reduce processing time, the 3D data obtained at one point in time can be compared with previously-obtained obtained 3D data to identify only those portions of the user and the surrounding environment that have changed. Processing only those portions of the user and the surrounding environment that have changed may reduce processing time.

The processing and control unit 115 can generate an output corresponding to, for example, the user input, as shown in block 525. In various implementations, the generated output can be projected into the field of view of the user as a visible radiation pattern, as shown in block 530. This process can be iteratively repeated to allow the user to interact with the projected output. For example, a visible output pattern, such as a virtual object, is projected. The output pattern can be, for example, a two-dimensional pattern projected onto a surface in the field of view. The output pattern can also be stereoscopic, so as to have a three-dimensional appearance when viewed with 3D-enabled eyewear or projected into a user's eyes, as discussed further herein. The user reacts to the virtual object with, for example, a gesture. The gesture is recognized and a characteristic of the projected virtual object is altered in response to the gesture. The altered virtual object, or other visible pattern, is projected, and the process repeats. A characteristic of the visible output pattern can be based on the 3D data (including user input, such as a gesture, that is recognized from the 3D data). Characteristics that can be based on the 3D data include, for example, the size, content, appearance, orientation, an associated functionality (e.g., an action performed when a user interacts with the visible light pattern), or the location to which the visible light pattern is projected.

The device 100 in the interactive mode can be used in a variety of applications. For example, the device 100 can be used to project an interactive graphical computer interface onto a surface (including a body part, such as a hand). The device 100 can also project a virtual keyboard or mouse pad, for controlling the graphical computer interface, onto a surface in the vicinity of the user. The user can then interact with the virtual keyboard or mouse pad by, for example, moving his or her finger (or some pointing object) on, or in proximity to, the surface on which the virtual keyboard or mouse pad is projected. The user's inputs can be identified based upon, for example, the 3D map of the user and his or her environment that is created at block 515. The user's inputs can be used to perform or control various functions through the graphical computer interface. For example, as shown in blocks 525 and 530 of FIG. 5, the user's inputs can be used to control a visible radiation pattern that is projected into the user's environment as part of the graphical computer interface. This visible radiation pattern could be, for example, a mouse pointer whose position on the graphical user interface is based on the user's movements on the virtual mouse pad. In addition, various user gestures could be defined to control actions of a device, such as, in the case of a computer, executing a mouse click, executing a program, etc. In some implementations, a virtual touchscreen display could be provided. For example, the device 100 could project an image of a display screen onto a surface. The user could then touch locations on the surface in order to execute various functions as if the surface were a touchscreen display. The locations of the user's touches can be determined from the 3D data. In some implementations, a user could also use gestures to indicate the location on the surface to project a virtual display. The user could also re-size or move the virtual display on the surface with gestures. Interactive gestures can be performed anywhere within the detected field of view of the device, and are not limited to the specific locations where the virtual display is projected.

In some implementations, the device 100 does not project a virtual keyboard or mouse pad onto a surface but instead simply tracks the user's movements in three dimensions. For example, since the device 100 creates a 3D representation of the user and his or her environment, the user can simply "type" in the air as if he or she were typing on a physical keyboard (or a 3D virtual keyboard could be projected by the device 100 to help guide the user's key strokes). The device 100 tracks and interprets the user's motions based on the 3D images that it obtains, and then outputs the "typed" text either to a physical display device or to a display projected by the optical projection module 105. Similarly, the user can draw in space with his or her finger, or a pointing device, and the device 100 can track those motions to control, for example, a mouse pointer on a display. Alternatively, the device 100 can create a 3D computer model of the shape that the user has drawn in space, or project a 3D image of the shape as the user draws it. In still other implementations, the user's movements can be used to play a video game.

In some implementations, a user can interact with a virtual object that is projected by the device 100. For example, the device 100 can project an image of the virtual object at a particular location within its field of view. The device 100 can then identify and track gestures by the user within the field of view (using the 3D representation of the field of view), and modify a characteristic of the projected virtual object (e.g., its size, appearance, interactive function, orientation, perspective, or location) in response to the user's gestures. For example, if the virtual object were a ball, either projected as a 2D or a 3D representation, as discussed herein, the user could virtually grab or bounce the ball by performing appropriate gestures in the field of view where the virtual ball appears. The device 100 can then update, for example, the projected location of the ball within the field of view in response to a gesture. This process can be performed iteratively, as illustrated in FIG. 5, to allow the user to virtually interact with the augmented reality environment. Again, this interaction could occur, for example, on a surface on which a virtual object or other visible pattern is projected, in the space where the virtual object or other visible pattern appears to be, in the case of a 3D projection (the user can wear 3D enabled eyewear), or in some other location within the field of view of the device 100. It should be understood, that many different virtual objects and associated interactions can be implemented.

Figure 6:
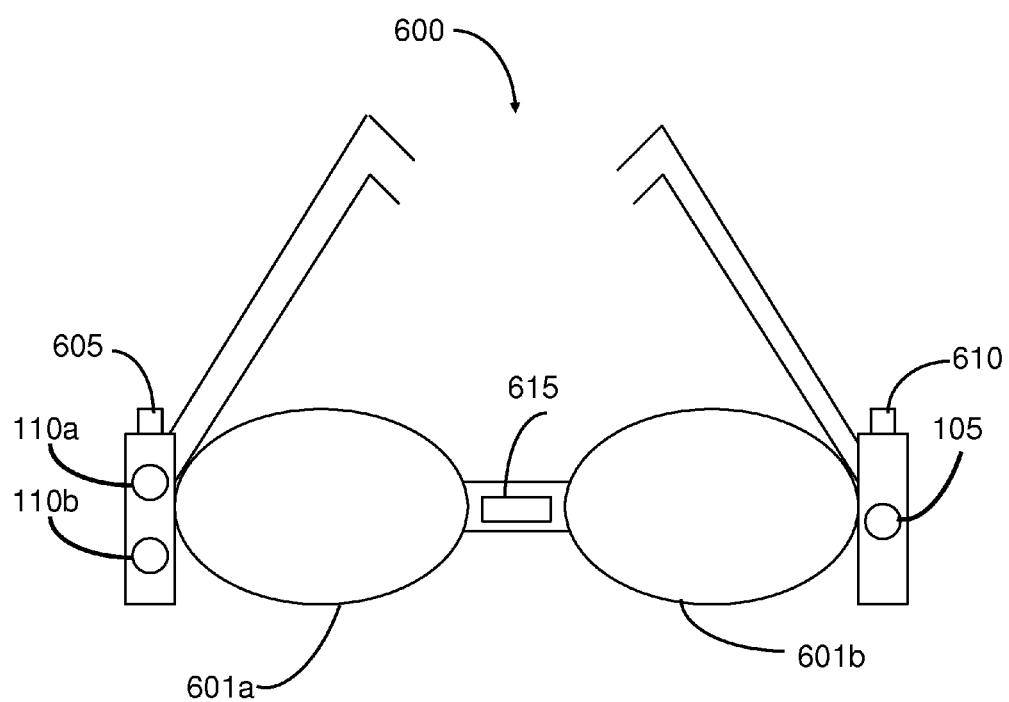
FIG. 6 is an implementation of eyewear in which at least a portion of the devices illustrated in FIGS. 1 and 4 can be integrated.

FIG. 6 is an example implementation of eyewear 600 in which at least a portion of the device 100 illustrated in FIGS. 1 and 4 can be integrated. The eyewear 600 can include the optical projection module 105. The eyewear can also include the sensors 110a and/or 110b, which, as discussed herein, can be a visible light camera and an invisible light camera (e.g., an infrared camera). In addition, the eyewear 600 can include the processing and control unit 115. The visible light camera and the invisible light camera can be mounted on the eyewear 600 so as to obtain visible light images and invisible light images of a field of view in front of the user of the eyewear. Similarly, the optical projection module 105 can be mounted on the eyewear 600 so as to project at least invisible (e.g., infrared) radiation patterns into the field of view in front of the person using the eyewear 600. In this way, the eyewear 600 can create 3D images or representations of the environment or scene in front of the user, as discussed herein.

In addition, the eyewear 600 can project visible patterns into the environment or scene in front of the user. As discussed herein, these visible patterns can be, for example, virtual objects, text, graphics, images, symbols, colors, etc. that are projected onto a surface or object in front of the user to create an augmented reality for the user. As discussed herein, in some implementations, the projected visible pattern can even be three-dimensional in appearance. This can be accomplished by using the optical projection module 105 to project separate right-eye and left-eye visible patterns, which can be selectively transmitted to the user's right and left eyes, respectively, by the eyewear 600. For example, if the projected visible pattern were a ball, the optical projection module 105 could project separate right-eye and left-eye versions of the ball image in such a way as to simulate the parallax shift that would exist between the user's right and left eyes if viewing a physical ball. The eyewear 600 selectively transmits the right-eye image to only the user's right eye, while also selectively transmitting the left-eye image to only the user's left eye. In this way, a 3D virtual optical can be projected before the user. In some implementations, the user can interact with this 3D virtual object using, for example, hand gestures, as discussed herein.

There are various ways to carry out the selective transmission of the right-eye and left-eye projected visible patterns to the user's right-eye and left-eye, respectively. For example, in various implementations, lenses of the eyewear 600 can include one or more light modulating elements (e.g. liquid crystal, optical shutters, optical switches, etc.). The light modulating elements can be activated and deactivated such that the eyewear 600 alternately darkens over one eye and then the other. If the right-eye and left-eye projected visible patterns are projected in an alternating fashion in time, and the light modulating elements are synchronized with the right-eye and left-eye projections, then the stereoscopic 3D effect of the projected visible radiation pattern can be achieved. In other implementations, each of the lenses of the eyewear can be designed so as to only transmit a particular polarization of light. The optical projection module 105 can be configured to project the right-eye visible radiation pattern with the polarization corresponding to the right lens, and to project the left-eye visible radiation pattern with the polarization corresponding to the left lens. In some implementations, two separate optical projection modules may be provided on either side of the eyewear 600 to generate the left-eye and right-eye images.

In various implementations, the eyewear 600 can be a portion of a head mounted display. For example, visible patterns (virtual objects, text, graphics, images, symbols, colors, etc.) can be projected into the eyes by the optical projection module 105 by reflecting off of the lens surfaces 601*a* and 601*b*. The lens surfaces 601*a* and 601*b* can be at least partially transmissive to visible light so as to permit the user to see through the lenses. However, the lens surfaces 601*a* and 601*b* can also be designed to be partially reflective to visible light so that they can reflect a projected visible radiation pattern onto the user's retinas. For example, the lens surfaces of the eyewear can be treated with, for example, narrowband trichroic reflectors that correspond with the wavelengths of a color laser projector (e.g., the narrowband trichroic reflectors could reflect a narrow range of light around the red, green, and blue wavelengths of a color laser projector). Such trichroic reflectors would allow light from a color laser projector to be reflected off of the inner lens surfaces and into the eyes while still permitting the user to see through the lenses to observe the forward field of view. The lens surfaces can be curved in such a manner that laser beams from one or more optical projection modules 105 mounted on the eyewear (for example, a separate module for each lens) are reflected by the lens surfaces and into the eyes to form the visible radiation pattern directly on the retinas. In these implementations, the eyewear 600 and the optical projection module 105 can together function as a retinal projection display device. In such implementations, the characteristics of the projection beams and the distance between the lens surfaces 601*a* and 601*b* and the eye can be selected to provide a diffraction-limited system that can provide high quality images using the retinal projection feature. In some implementations, the lenses of the eyewear can include optical coatings to cause the lens surfaces to be substantially reflective to the visible wavelengths used by the projection module, while being substantially transmissive to other wavelengths of visible light. In some implementations, the lenses may be active-matrix organic light-emitting diode (AMOLED) displays, which can be configured to be transmissive or to display information to the user.

A wide variety of visible patterns can be projected into the user's eyes by the eyewear 600. In some implementations, the visible patterns projected into the eyes can include a feed of the images from the invisible light camera. In the case of an infrared camera, the eyewear could then serve as a night vision goggles. In addition, the visible patterns projected into the eyes could include a feed of the images from the visible light camera. In the case of a wide-angle or telephoto camera, the user's normal visual field of view could accordingly be widened or narrowed.

Some implementations of the eyewear 600 can include an accelerometer 615 that can be used to adjust, for example, a characteristic (e.g., orientation, perspective, size, etc.) of the projected visible light pattern based on movement of the user's head, as detected by the accelerometer. For example, if the user tilts his or her head, then the projected visible light pattern can be tilted to compensate for the head tilt. In addition, if the user turns his or her head, the perspective of the projected visible light pattern can be shifted as if the user were looking at a different side of an actual physical object. If the user moves further away from the projected visible light pattern, then the pattern can be magnified, etc. In addition, various implementations of the eyewear 600 can include a microphone 605 that can be used to pick up audio signals from the environment.

In some implementations, the eyewear 600 can include a transceiver 610 for communicating with a remote device 100. For example, the remote device 100 can include the optical projection module 105, which can, among other things, project right-eye and left-eye versions of a visible pattern. The transceiver 610 can be used to synchronize the action of optical modulators in the lenses with the right-eye and left-eye versions of the projected visible pattern so as allow for a stereoscopic 3D effect, as discussed herein. In addition, in various implementations, the input obtained by the sensors 110*a* and 110*b* (e.g., a visible light camera and an invisible light camera) on the eyewear 600 can be transmitted wirelessly, using the transceiver 610, to a remote system that can include the processing and control unit 115. The output generated by the processing and control unit 115 can be transmitted from the remote system and received by the transceiver 610 disposed on the eyewear 600. In various implementations, the input obtained by the sensors 110*a* and 110*b* can be processed remotely using cloud computing technology, which can also be used to process any of the other data, in any of the implementations, described herein. In some implementations, either or both the projector module and the cameras are integrated with the glasses, while in other implementations either or both the projector module and the cameras are part of a separate device that is communicatively coupled to the eyewear (for example, by wireless transceivers).

Figure 7:
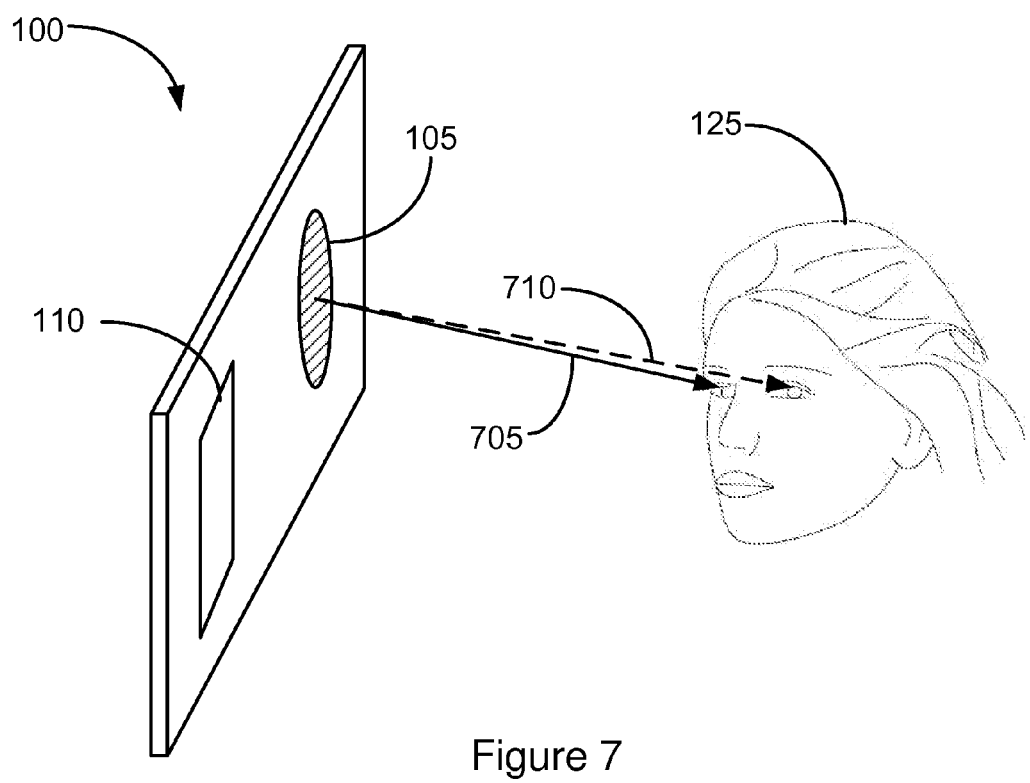
FIG. 7 illustrates an example implementation of the device illustrated in FIGS. 1 and 4 that includes a retinal projection feature.

FIG. 7 illustrates an example implementation of the device 100 illustrated in FIGS. 1 and 4 that includes a retinal projection feature. The device 100 illustrated in FIG. 7 functions similar to what has been described elsewhere herein, except that the optical projection module 105 can be configured to project the visible radiation pattern (e.g., a virtual object, text, graphics, images, symbols, color patterns, etc.) directly into each eye of the user 125. The device 100 can be configured such that the visible radiation pattern is projected into the user's eye while the invisible radiation pattern is projected into the environment surrounding the user to generate 3D data of the user and the surrounding environment. For example, in some implementations, when the scanning mirror 210 of the optical projection apparatus is directed about a first direction, the visible radiation pattern is projected into the user's right eye with beam 705, and subsequently when the scanning mirror 210 is directed about a second direction, the visible radiation pattern projects into the user's left eye with beam 710. In this example, the beams 705 and 710 originate from a common scanning mirror 210. In other implementations, multiple beams originating from different scanning mirrors 210, or different projection modules, can be projected into the user's eyes. For example, multiple projection modules could be used to allow for retinal projection to users in a 360 degree field of view. Additionally, multiple scanning mirrors of various sizes and locations can be used in succession. In various implementations, the device 100 may be configured to track the user's eyes, for example, based on the 3D data, so that the visible radiation pattern can be projected into the user's eye repeatedly over time.

In some implementations, the device 100 may be configured to generate separate right-eye and left-eye versions of the projected visible radiation pattern with a simulated parallax shift. The left-eye version of the visible radiation pattern is projected into the person's left eye, and the right-eye version is projected into the right eye to create a 3-D stereoscopic effect. For example, in the implementation illustrated in FIG. 7, beam 705 could provide the right-eye version of the projected visible radiation pattern and beam 710 could provide the left-eye version of the projected visible radiation pattern.

In various implementations, the device 100 may be configured to track more than one user's eyes, and may be configured to project different visible radiation patterns to different user's eyes simultaneously. The device 100 can also track gestures from the multiple users simultaneously (based on the 3D image data of the scene) so as to allow each of the users to simultaneously interact with, for example, virtual objects that are projected into their eyes. One advantage of a device 100 with the retinal projection feature described herein is privacy. For example, in various implementations, the device 100 can be configured to project certain information to certain users without that information being visible to other users. The device 100 can rely on facial recognition algorithms to select users on an individual basis and project specific information to each individual user selected.

Figure 8:
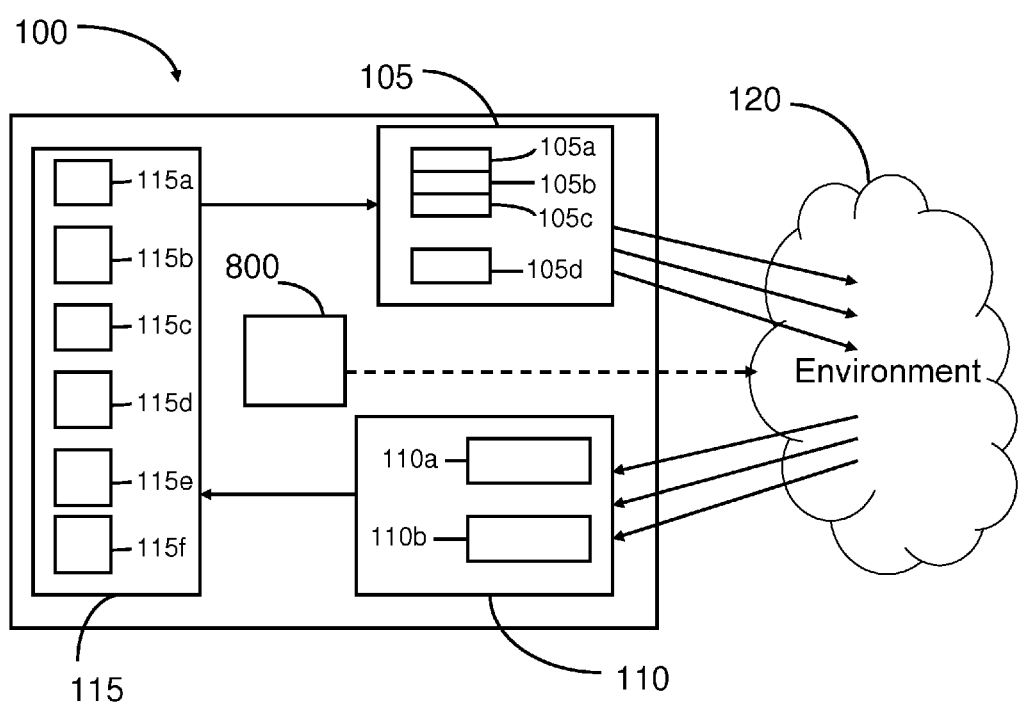
FIG. 8 illustrates an example implementation of a device that can be used to turn on/off or charge electronic objects in the surrounding environment.

FIG. 8 illustrates an example implementation of a device 100 that can be used to turn on/off or charge electronic objects in the surrounding environment. As discussed herein, the device 100 can also be used to transmit data to an electronic object in the surrounding environment. The implementation of the device 100 illustrated in FIG. 8 can be similar to those described elsewhere herein. However, the device 100 illustrated in FIG. 8 can include a steerable, directional source of radiation. In some implementations, the directional source of radiation is the optical projection module 105 (which includes the sources 105a-105d that are steered with the mirror 210). In other implementations, a separate steerable, directional radiation source 800 can be provided. The radiation source 800 can be structurally and functionally similar to the optical projection apparatus 105. The optical projection module 105 or directional source of radiation 800 can be used, for example, to wirelessly transfer power to charge an electronic device located within the field of view of the device 100, and/or power the device in real time. The optical projection module or the directional source of radiation 800 can be configured, for example, to emit electromagnetic radiation in the visible, infrared, terahertz, RF, or microwave spectral regions. The electronic device towards which the electromagnetic radiation emitted by the source 800 is directed can be received by a photodiode (e.g. a semiconductor based photovoltaic cell) included in the electronic device and converted into usable electricity. In addition, the electronic device being charged/powered can also include an array of photodiodes (e.g., an array of independent photodiodes, a CMOS/CCD camera, etc.) that is capable of, for example, resolving changes in the spatial profile of the beam of electromagnetic radiation. This capability can be used to receive data transmissions, as discussed herein.

Figure 9:
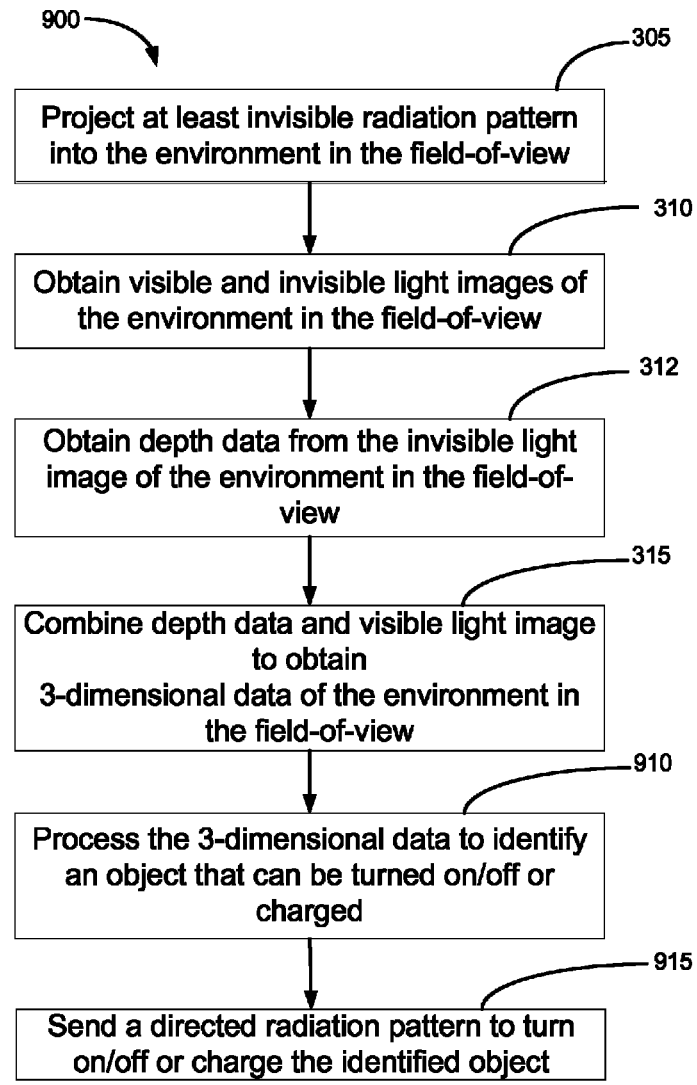
FIG. 9 is a flow chart illustrating an example method of turning on/off or charging electronic objects in the surrounding environment using the device illustrated in FIG. 8.

FIG. 9 is a flow chart 900 illustrating an example method of turning on/off or charging electronic objects in the surrounding environment. Some of the elements of the flowchart 900 can be generally similar to the elements depicted in FIGS. 3A and 3B. As discussed herein, the device 100 generates 3D data of the environment in the field of view by performing operations described in blocks 305, 310, 312 and 315. The 3D data can be processed and analyzed by the processing and control unit 115 to identify electronic objects (e.g. phones, televisions, gaming consoles, etc.) that can be turned on/off or charged, as shown in block 910. In various implementations, other methods of identifying electronic objects can be employed, such as, for example, wireless communication feedback from the electronic object (e.g., using an ad-hoc/WWAN network, etc.). A beam of electromagnetic radiation from the radiation source 105, 800 can then be directed towards the identified electronic device to charge the device, as shown in block 915. In some cases, the wireless power transfer described herein may not necessarily be limited to line-of-sight beam paths. This may be true, for example, if terahertz radiation is used for the charging beam, since such radiation can propagate through certain materials. The power level of the charging beam, and/or an available light source with the most efficient properties (e.g., wavelength) for power transfer to a particular device, can be selected based on wireless communications with the remote electronic device. In addition, information, such as on/off commands, or data, can be provided to the electronic device via the beam of electromagnetic radiation by modulating the beam. For example, the spatial, temporal, spectral, polarization, and/or output power of the electromagnetic beam, or of a plurality of beams, can be modulated to transmit data to the electronic device. In the case where the optical projection module 105 includes multiple light sources at different wavelengths, and/or a single light source capable of producing light of multiple wavelengths, data transfer with wavelength division multiplexing could be performed. In some implementations, the remote electronic device has an array of one or more photodetectors (e.g., photodiodes, photovoltaic cells, Coherent Perfect Absorbers, etc.) designed or optimized to the spectrum of the beam of electromagnetic radiation that is powering the electronic device and/or transmitting data to the electronic device. In some implementations, the electronic device that is being powered can also include an instance of the device 100 (or any of the sub-components thereof). In such implementations, the electronic device can transmit data back to the device 100 that it is being powered by, and the data can be received, for example, by the sensors 110a-b (e.g., visible and/or invisible light cameras). This data can also be transferred by modulating a beam of electromagnetic radiation. The device 100 can receive the data using, for example, its one or more cameras.

Figure 10:
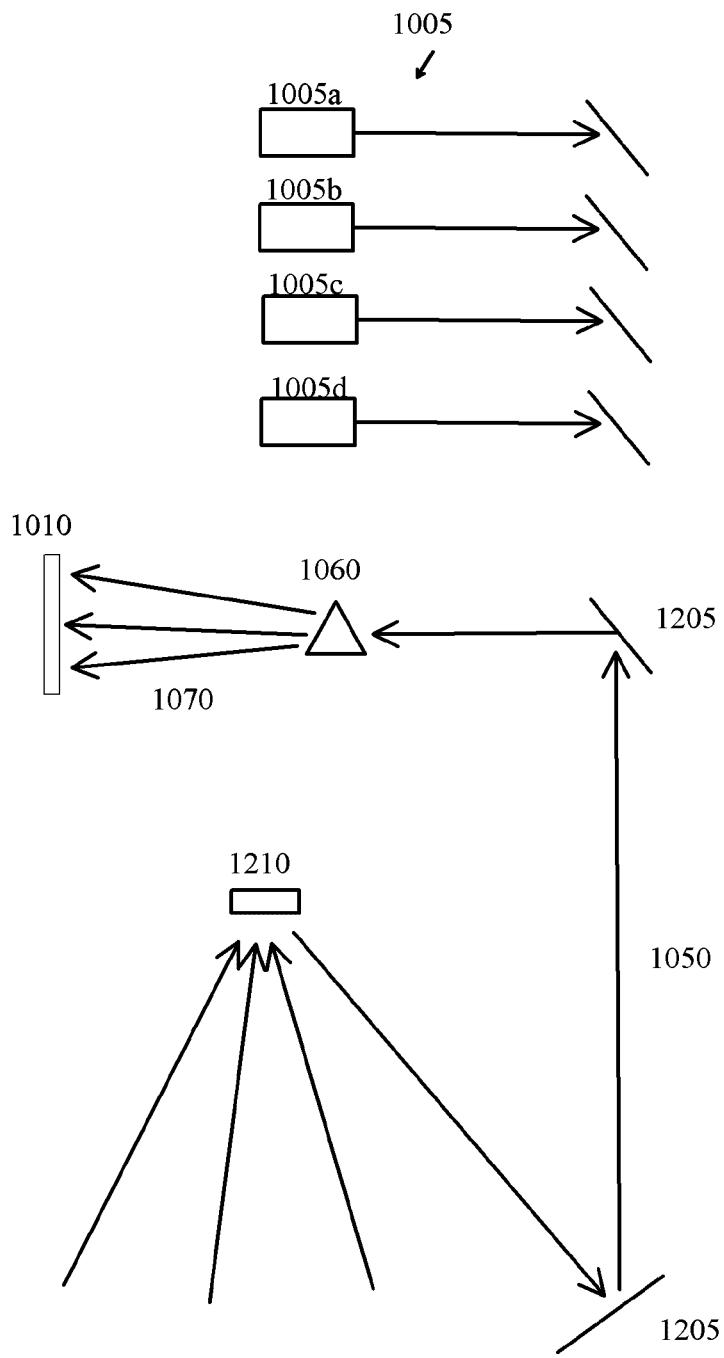
FIG. 10 illustrates an example embodiment of a device that can be used to collect 3D and multispectral information about an environment within a field of view.

FIG. 10 illustrates an example embodiment of a device 1000 that can be used to collect 3D and multispectral information about an environment within a field of view. The device 1000 can be similar to those illustrated in FIGS. 1 and 2 (e.g., device 100). For example, the device 1000 can include an optical projection module 1005 having optical sources 1005a-d. These can be, for example, red, green, blue, and infrared laser diodes. The outputs of these optical sources can be combined and scanned across a field of view using a scanning mirror 1210, as described herein with respect to FIG. 2. The device 1000 can also include an image sensor 1010. The image sensor 1010 can receive incoming light 1050 from the field of view via the scanning mirror 1210 and the reflectors 1205. The incoming light 1050 from the field of view can be scanned across the image sensor 1010 by the scanning mirror 1210 just as the output beam from the optical sources 1005 is scanned across the field of view.

The incoming light 1050 can also be passed through a dispersive optical element 1060, such as a prism or a diffraction grating. The dispersive optical element 1060 can separate the incoming light 1050 into its spectral components 1060, including one or more spectral components outside the visible spectrum. The spectral components 1070 are then incident upon the image sensor 1010 and can be recorded for each resolvable point within the field of view. If, for example, the spectral information is collected for a line of points in the field of view at a time, then each line of sensor pixels in one dimension corresponds to one of the points from the field of view, while corresponding sensor pixels in the perpendicular direction record the spectral data for each point. The scanning mirror 1210 can then be operated to collect the spectral data for a subsequent line of points in the field of view. Though not illustrated, the scanning mechanism can also include a slit for limiting the incoming light 1050 to a line of points from the field of view at the time. In this way, the spectral signature of each point in the field of view can be measured along with the depth and color information already discussed herein. By collecting multispectral data, including one or more spectral components outside the visible spectrum, for each point in the field of view, it may be possible, for example, to identify objects in the field of view based upon their unique spectral signature. In some implementations, the device 1000 can also be used to collect hyperspectral information from one or more points in the field of view. The device 1000 can be used to project light to a location or subset of space in one or more fields of view, including for any of the reasons and/or applications discussed herein with regard to any other device.

A multispectral time of flight imaging system can be implemented. For example, a pulsed light source can be used to emit light pulses that are scanned across a field of view using a scanning mechanism. The pulsed light emitted in a particular direction can be backscattered from the surrounding environment within the field of view. The pulsed light can be collected, and optionally passed through a dispersive optical fiber to stretch out the pulse in the time domain. The backscattered light pulse from each direction can be recorded by a photodetector. Then, a Fourier transform can be performed on the recorded time domain data for each pulse in order to extract the spectral information for each sampled point within the field of view. In addition, the round-trip time of flight for each pulse can be determined in order to extract depth data.

The foregoing devices and methods can be integrated with a variety of electronic devices, including, but not limited to, mobile telephones, personal digital assistants (PDAs), computers (including desktop computers, laptop computers, tablets, etc.), cameras, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), eyewear, head mounted displays, etc. Thus, the teachings are not intended to be limited to the implementations depicted solely in the figures, but instead have wide applicability as will be readily apparent to a person having ordinary skill in the art.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations can also be combined and implemented in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

The various illustrative logical blocks, modules, circuits, and algorithm steps described in connection with the implementations disclosed herein may be implemented as electronic hardware, computer software, or combinations of both. Owing to the interchangeability of hardware and software, the various illustrative logical blocks, modules, circuits, and algorithm steps have been described generally in terms of functionality. Whether such functionality is implemented in hardware or software depends upon the particular application and design constraints imposed on the overall system.

Any hardware and data processing devices used to implement the various illustrative logical blocks, modules and circuits described herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

Implementations of the subject matter described in this specification can also be implemented as one or more computer programs, e.g., one or more modules of computer program instructions, encoded on a computer storage medium for execution by, or to control the operation of, a data processing apparatus. If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

What is claimed is:

1. A system for remotely powering an electronic device, the system comprising:
    one or more sensors, the one or more sensors being configured to detect at least invisible light from a field of view;
    one or more projectors, the one or more projectors being configured to project at least invisible light into the field of view; and
    one or more processors configured to
        control the one or more projectors to project at least one or more invisible light patterns into the field of view;
        analyze the invisible light detected by the one or more sensors in order to identify the location of an electronic device within the field of view; and
        control the one or more projectors to project a beam of electromagnetic radiation toward the identified location in the field of view in order to power the electronic device by wirelessly transferring energy to the electronic device.

2. The system of claim 1, wherein the electronic device comprises one or more photodiodes to receive the beam of electromagnetic radiation and to produce electricity from the beam of electromagnetic radiation.

3. The system of claim 1, wherein the one or more projectors are further configured to transmit data to the electronic device by modulating the beam of electromagnetic radiation.

4. The system of claim 3, wherein the one or more projectors are configured to transmit data via spatial, temporal, spectral, polarization, and/or output power modulation of the beam of electromagnetic radiation.

5. The system of claim 3, wherein the electronic device receives data by using a photodiode or an array of photodiodes.

6. The system of claim 1, wherein the one or more processors are configured to analyze the invisible light detected by the one or more sensors in order to receive data from the electronic device.

7. The system of claim 1, wherein the one or more processors are configured to analyze the invisible light in order to generate depth data used to identify the location of the electronic device in the field of view.

8. The system of claim 1, wherein the location of the electronic device is identified at least in part by establishing a data connection with the electronic device, and receiving location information from the electronic device.

9. The system of claim 1, wherein the remote device comprises an array of one or more photodetectors optimized to the spectrum of the beam of electromagnetic radiation.

10. The system of claim 1, wherein the one or more sensors comprise one or more cameras configured to create one or more visible or invisible light images of the one or more fields of view.

11. A method for remotely powering an electronic device, the method comprising:
    detecting at least invisible light from a field of view using one or more sensors;
    projecting at least invisible light into the field of view using one or more projectors; and
    performing processing with one or more processors to
        control the one or more projectors to project at least one or more invisible light patterns into the field of view;
        analyze the invisible light detected by the one or more sensors in order to identify the location of an electronic device within the field of view; and
        control the one or more projectors to project a beam of electromagnetic radiation toward the identified location in the field of view in order to power the electronic device by wirelessly transferring energy to the electronic device.

12. The method of claim 11, wherein the electronic device comprises one or more photodiodes to receive the beam of electromagnetic radiation and to produce electricity from the beam of electromagnetic radiation.

13. The method of claim 11, further comprising transmitting data to the electronic device by modulating the beam of electromagnetic radiation.

14. The method of claim 13, further comprising transmitting the data via spatial, temporal, spectral, polarization, and/or output power modulation of the beam of electromagnetic radiation.

15. The method of claim 13, wherein the electronic device receives data by using a photodiode or an array of photodiodes.

16. The method of claim 11, further comprising analyzing the invisible light detected by the one or more sensors in order to receive data from the electronic device.

17. The method of claim 11, further comprising analyzing the invisible light in order to generate depth data used to identify the location of the electronic device in the field of view.

18. The method of claim 11, further comprising identifying the location of the electronic device at least in part by establishing a data connection with the electronic device, and receiving location information from the electronic device.

19. The method of claim 11, wherein the remote device comprises an array of one or more photodetectors optimized to the spectrum of the beam of electromagnetic radiation.

20. The method of claim 11, wherein the one or more sensors comprise one or more cameras configured to create one or more visible or invisible light images of the one or more fields of view.

* * * * *